United States Patent
Won et al.

(10) Patent No.: US 7,719,744 B2
(45) Date of Patent: May 18, 2010

(54) ONE DIMENSIONAL SPATIAL LIGHT MODULATOR AND IMAGE OUTPUT DEVICE EMPLOYING THE SAME

(75) Inventors: Jong-hwa Won, Seoul (KR);
Yong-kweun Mun, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 11/872,061

(22) Filed: Oct. 15, 2007

(65) Prior Publication Data
US 2008/0204858 A1    Aug. 28, 2008

(30) Foreign Application Priority Data
Feb. 28, 2007   (KR) .................. 10-2007-0020592

(51) Int. Cl.
*G02F 1/03* (2006.01)
(52) U.S. Cl. ........................... 359/245; 359/290
(58) Field of Classification Search ........... 359/245
See application file for complete search history.

(56) References Cited

U.S. PATENT DOCUMENTS

| | | | | |
|---|---|---|---|---|
| 5,463,493 A | * | 10/1995 | Shah | 359/312 |
| 6,404,492 B1 | * | 6/2002 | Xu et al. | 356/326 |
| 2004/0095524 A1 | * | 5/2004 | Date et al. | 349/89 |

\* cited by examiner

*Primary Examiner*—Jordan M. Schwartz
*Assistant Examiner*—James C Jones
(74) *Attorney, Agent, or Firm*—Sughrue Mion, PLLC

(57) ABSTRACT

A one-dimensional (1D) spatial light modulator (SLM) and an image output device employing the same are provided. The 1D SLM includes: a light deflector including a light guide that is formed of a photonic crystal material having a refractive index that can be varied according to an applied voltage and allows incident light to continue along an original propagation path or deflects the incident light from the original propagation path on a pixel-by-pixel basis, and an electrode portion individually applying a voltage to the light guide; and a light blocking member facing a light exiting surface of the light deflector and blocking a portion of light exiting the light deflector.

19 Claims, 8 Drawing Sheets

ONE DIMENSIONAL SPATIAL LIGHT MODULATOR AND IMAGE OUTPUT DEVICE EMPLOYING THE SAME

CROSS-REFERENCE TO RELATED PATENT APPLICATION

This application claims priority from Korean Patent Application No. 10-2007-0020592, filed on Feb. 28, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to a one-dimensional (1D) spatial light modulator (SLM) and an image output device employing the same, and more particularly, to a transmissive 1D SLM for modulating linear shaped light using an electro-optic effect and an image output device employing the same.

2. Description of the Related Art

In general, 1D SLMs are used for image output devices such as printers or displays, and used to modulate linear shaped light on a pixel-by-pixel basis.

As an example, a laser scanner for a related art laser printer achieves 1D light modulation by rotating a polygon mirror using an electric motor, and scanning laser light onto a mirror surface of the polygon mirror to change the propagation direction of laser light being reflected. However, the laser scanner produces a large amount of audible noise due to the presence of a driving element, and permits little flexibility in selecting alternative designs. Another drawback is that optical components such as the polygon mirror require an additional optical system for compensating for optical aberrations.

As another example of a related art spatial light modulator, a light emitting diode (LED) head includes a plurality of LEDs aligned in a line. A printer using an LED head has been presented in Japanese Patent Application Laid-Open Gazette No. 2000-025265. The LED head controls operation of each LED to expose a photosensitive device, thus functioning as a 1D light modulator. The LED head permits high flexibility in selecting alternative designs and uniform intervals between pixels. However, the LED head has drawbacks in that it is difficult to maintain uniform intensity or lifespan of each LED and it generates a great amount of heat.

As yet another example of a relate art, a grating light valve (GLV) is a Micro-Electromechanical System (MEMS) using diffraction of light. A display device incorporating GLVs has been proposed in U.S. Pat. No. 5,982,553. The GLV modulates light using the fact that a diffraction grating including ribbons is moved by an electrostatic driving force so light incident thereon is diffracted to a varying extent. The GLV has a drawback in that the manufacturing process thereof is complicated. Another drawback is that residual charges are created due to mechanical driving caused by static electricity and sticking occurs due to charge buildup.

SUMMARY OF THE INVENTION

The present invention provides a one-dimensional (1D) spatial light modulator (SLM) that does not include a mechanical drive element and an image output device employing the same.

According to an aspect of the present invention, there is provided a 1D SLM including: a light guide that is formed of a photonic crystal material having a refractive index that can be locally varied according to an applied voltage and allows incident light to continue along its original propagation path or deflects the incident light from its original propagation path on a pixel-by-pixel basis and an electrode portion individually applying a voltage to each pixel; and a light blocking member facing a light exiting surface of the light deflector and blocking a portion of light exiting the light deflector.

According to another aspect of the present invention, there is provided an image output device including: the above-mentioned 1D SLM and an exposed object having an exposed surface that is irradiated by linear shaped light modulated by the 1D spatial light modulator, the exposed object moving perpendicular to a longitudinal direction of the linear shaped light so as to create a two-dimensional (2D) latent image thereon.

The image output device may further include a micro lens array that is disposed between the 1D SLM and the exposed object and includes a plurality of lens cells arranged in a line to focus linear shaped light modulated by the 1D SLM on a pixel-by-pixel basis.

In another exemplary embodiment, the image output device may include the 1D SLM and a 1D optical scanner scanning the linear shaped light modulated by the 1D SLM in a direction perpendicular to the longitudinal direction of the linear shaped light.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

The present invention will now be described more fully with reference to the accompanying drawings, in which exemplary embodiments of the invention are shown.

A one-dimensional (1D) spatial light modulator (SLM) according to an exemplary embodiment of the present invention and an image output device employing the same will now be described in detail with reference to FIG. 1.

Figure 1:
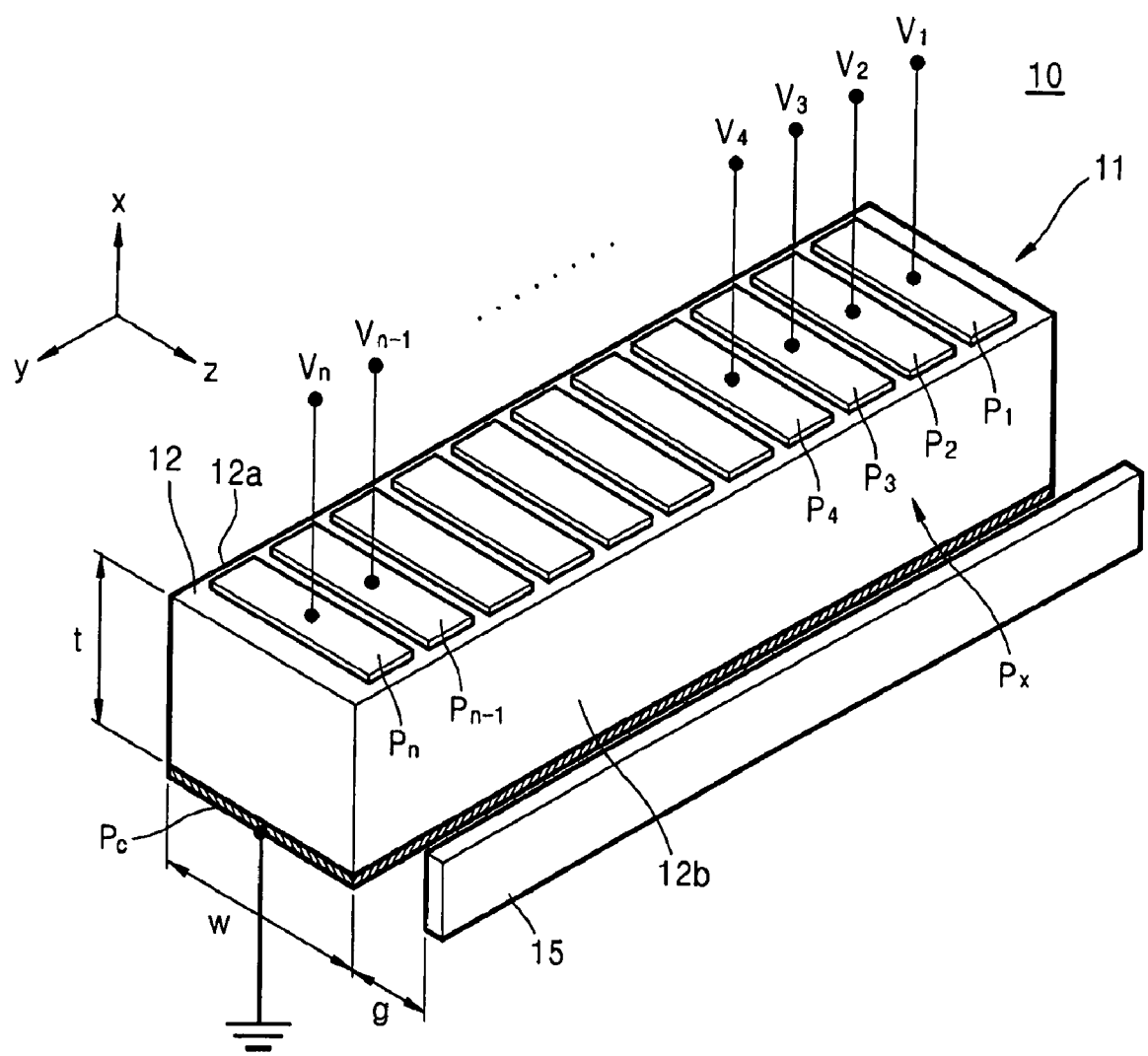
FIG. 1 is a perspective view of a one-dimensional (1D) spatial light modulator (SLM) according to an exemplary embodiment of the present invention.

FIG. 1 is a perspective view of a 1D SLM according to an exemplary embodiment of the present invention. Referring to FIG. 1, the 1D spatial light modulator 10 includes a light deflector 11 deflecting linear shaped light being transmitted using electro-optic effects, and a light blocking member 15 that is disposed to face an exit surface 12b of the light deflector 11 and blocks light deflected by the light deflector 11. The linear shaped light refers to light having a linear cross-section.

The light deflector 11 directs or deflects linear shaped light being transmitted on a pixel-by-pixel basis. That is, the light deflector 11 allows incident light to continue along its original propagation path or deflects the incident light from its original propagation path on a pixel-by-pixel basis. The light deflector 11 can adjust an angle at which light is deflected on a pixel-by-pixel basis according to an applied voltage as described below.

The light deflector 11 includes a light guide 12 and an electrode portion applying a voltage to the light guide 12.

The light guide 12 is formed of a photonic crystal having electro-optic characteristics that can deflect transmitted linear shaped light due to an applied voltage. Lithium niobate (LiNbO$_3$) (hereinafter referred to as 'LiNbO') and potassium (K)-tantalum (Ta)-niobium (Nb) (hereinafter referred to as 'KKTN') are known as photonic crystal materials. When a voltage is applied to a photonic crystal, the optical characteristics of the photonic crystal vary according to an electric field applied thereto. The 1D SLM 10 according to the present exemplary embodiment uses the principle that the refractive index of the photonic crystal varies according to an electric field applied thereto.

The light guide 12 may have a rectangular parallelopiped shape. The linear shaped light is incident on an incident surface 12a of the light guide 12 and continues along its original propagation path, or is deflected from its original propagation path while passing through the exit surface 12b of the light guide 12. Hereinafter, light continuing along its original propagation path is referred to as 'directed light' and light deflected from its original propagation path is referred to as 'deflected light'. The degree of separation between light ($L_1$ in FIG. 2) being directed and light ($L_2$ in FIG. 2) being deflected is affected by a width w between the incident surface 12a and the exit surface 12b of the light guide 12. Thus, the incident linear shaped light can be deflected to a sufficient extent by adjusting the width w. Furthermore, because the linear shaped light is deflected inside the light guide 12 in a thickness direction (a±x direction in FIG. 2), the thickness t of the light guide 12 is sufficiently large so that the deflected linear shaped light can exit through the exit surface 12b. The light guide 12 may have any other shape as long as linear shaped light is incident on the incident surface 12a thereof and is directed through or deflected through the exit surface 12b.

The electrode portion individually applies a voltage to the light guide 12 on a pixel-by-pixel basis, and includes first and second electrodes $P_X$ and $P_C$ disposed on opposing sides in the x direction of the light guide 12.

The first electrode $P_X$ consists of a plurality of pixel electrodes $P_1$ through $P_n$ respectively coupled to single voltage sources $V_1$ through $V_n$. The second electrode $P_C$ is grounded and acts as a common electrode. Voltages are individually applied to the plurality of pixel electrodes $P_1$ through $P_n$ from the single voltage sources $V_1$ through $V_n$. When a voltage is applied to each of the plurality of pixel electrodes $P_1$ through $P_n$, each pixel electrode is electrostatically coupled to the second electrode $P_C$ so as to create an electric field therebetween.

The first and second electrodes $P_X$ and $P_C$ of the electrode portion make ohmic contact with the light guide 12. For example, if the light guide 12 and the electrode portion are formed of KTN and Ti, respectively, an ohmic contact may be created at the interface between the light guide 12 and the electrode portion.

Figure 2:
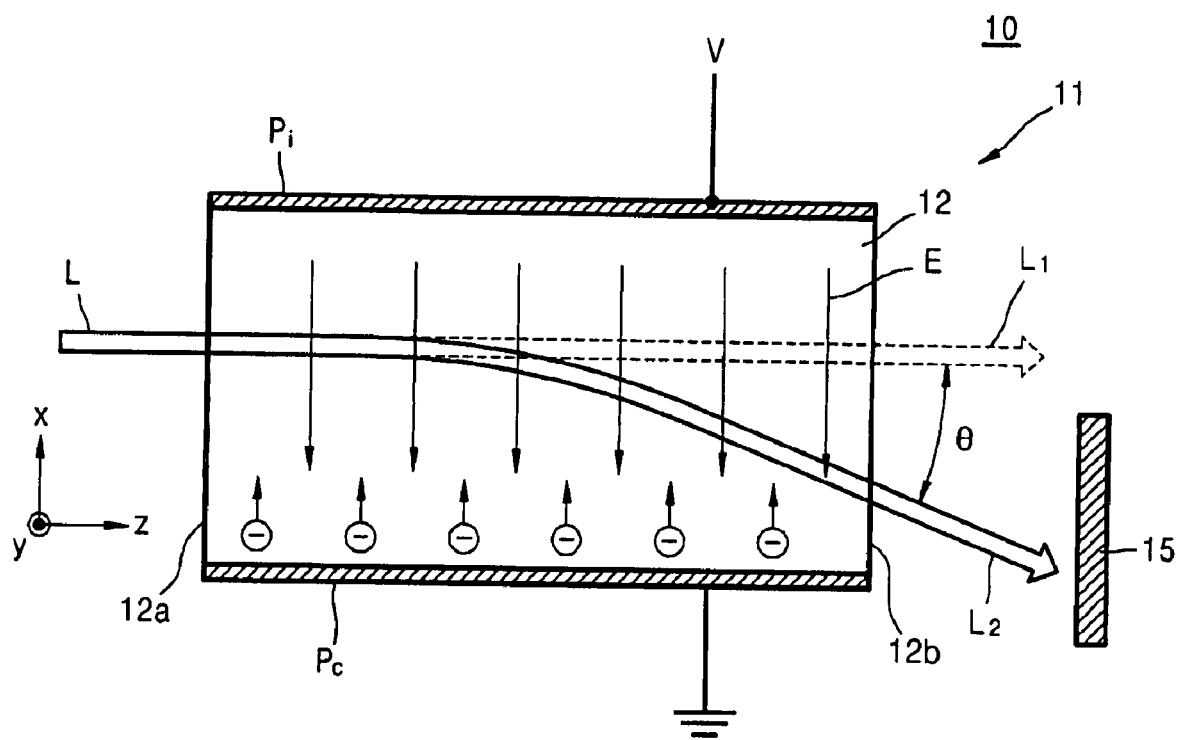
FIG. 2 illustrates light paths of the 1D SLM of FIG. 1, according to an exemplary embodiment of the present invention.

The first and second electrodes $P_X$ and $P_C$ are disposed parallel to each other on opposing sides of the rectangular parallelopiped light guide 12 and arranged in a line along a longitudinal direction (y direction in FIGS. 1 and 2). While FIG. 1 shows the sides on which the first and second electrodes $P_X$ and $P_C$ are disposed as being parallel to each other, they may be obliquely disposed with respect to each other.

Although the second electrode $P_C$ acts as one common electrode in the present exemplary embodiment, it may be divided into a plurality of insulating electrodes to form electrode pairs with the plurality of pixel electrodes $P_1$ through $P_n$.

The light blocking member 15 has a stripe shape and faces a portion of the exit surface 12b through which deflected light exits so as to transmit light directed through the light guide 12 while blocking deflected light. The light blocking member 15 may transmit a portion of the deflected light according to the degree of deflection while blocking the remaining portion. Thus, the intensity of linear shaped light passing through the light blocking member 15 may be adjusted on a pixel-by-pixel basis.

The degree to which light deflected by the light guide 12 is separated from light directed by the light guide 12 increases as the deflected light is further away from the exit surface 12b of the light guide 12. Thus, a distance g between the light guide 12 and the light blocking member 15 is large enough so that the light directed by the light guide 12 can be separated from the light deflected by the light guide 12 to a sufficient extent. If light being directed is sufficiently separated from light being deflected within the light guide 12, the light blocking member 15 may be attached or coated onto a portion of the exit surface 12b of the light guide 12.

Although in the above description, the light blocking member 15 faces a portion of the exit surface 12b of the light guide 12 through which linear shaped light being deflected passes, it may be disposed to face a portion of the exit surface 12b through which linear shaped light being directed exits so as to transmit the linear shaped light being deflected while intercepting the linear shaped light being directed. Furthermore, the light blocking member 15 may have a slit-shaped light transmitting portion that allows only light exiting at a predetermined angle to be transmitted therethrough.

The operation of the 1D SLM will now be described in detail with reference to FIG. 2.

FIG. 2 is a transverse cross-sectional view of the 1D SLM 10 of FIG. 1, showing the path of light when a voltage is applied to an i-th pixel electrode $P_i$.

Because the electrode portion makes an ohmic contact to the light guide 12 as described above, electric charges are injected into the light guide 12 upon application of a voltage to the electrode portion. When the electric charges are injected into the light guide 12, a region in which a magnetic field is created due to a potential difference becomes a space-charge-limited region, thus making distribution of an electric field nonuniform. Since the theory of space-charge-controlled conduction is well known to a person skilled in the art, a detailed explanation thereof will not be given.

If no voltage is applied to the i-th pixel electrode $P_i$, the i-th pixel electrode $P_i$ and the second electrode $P_C$ remain in a floating state. That is, if no voltage is applied to the i-th pixel electrode $P_i$, there is no electric field between the i-th pixel electrode $P_i$ and the second electrode $P_C$. In this case, because a region between the i-th pixel electrode $P_i$ and the second electrode $P_C$ has a constant refractive index, light $L_1$ of incident linear shaped light L passing through the region between the i-th pixel electrode $P_i$ and the second electrode $P_C$ is directed without being deflected.

According to the theory of space-charge-controlled conduction, when a voltage V is applied to the i-th pixel electrode $P_i$ with the second electrode $P_C$ grounded, an electric field E within the light guide 12 is defined as a function of a distance x from the second electrode $P_C$ by Equation (1):

$$E \sim V/d \cdot (x/d)^{1/2} \tag{1}$$

A variation $\Delta n$ of refractive index varies according to an electric field strength, as defined in Equation (2):

$$\Delta n \sim E^2 \sim V^2/d^3 \cdot x \tag{2}$$

As defined in Equation (2), because a variation in refractive index varies according to the square of the electric field strength, the refractive index of the region between the i-th pixel electrode $P_i$ and the second electrode $P_C$ can also be given as a function of the distance x from the second electrode $P_C$. If the refractive index of the region between the i-th pixel electrode $P_i$ and the second electrode $P_C$ varies in this way, light $L_2$ of the incident linear shaped light L passing through the region between the i-th pixel electrode $P_i$ and the second electrode $P_C$ can be deflected.

As described above, light $L_1$ passing through the region between the i-th pixel electrode $P_i$ and the second electrode $P_C$ is deflected or directed depending on whether or not an appropriate voltage is applied to the i-th pixel electrode $P_i$. In this case, because the deflected light $L_2$ is intercepted by the light blocking member 15 but the directed light $L_1$ is transmitted, light passing through the region between the i-th pixel electrode $P_i$ and the second electrode $P_C$ can be blocked or transmitted according to whether or not a voltage is applied to the i-th pixel electrode $P_i$.

The deflection angle $\theta$ between the light $L_2$ being deflected and light $L_1$ being directed varies depending on a variation in a refractive index within the light guide 12. Because the variation in a refractive index is in turn affected by a voltage applied to the electrode portion, the deflection angle $\theta$ can be adjusted by adjusting a magnitude of an applied voltage. If the deflection angle $\theta$ of the light $L_2$ is small, a portion of the light $L_2$ is not completely blocked by the light blocking member 15. That is, the 1D light modulator 10 allows adjustment of the amount of light passing therethrough by adjusting an applied voltage, thus facilitating gradation expression of an image.

The above-described example can be applied to any other one of the plurality of pixel electrodes $P_1$ through $P_n$ in the same manner. A 1D spatial modulator with 8 pixel electrodes will now be described in brief with reference to FIGS. 3 and 4.

Figure 3:
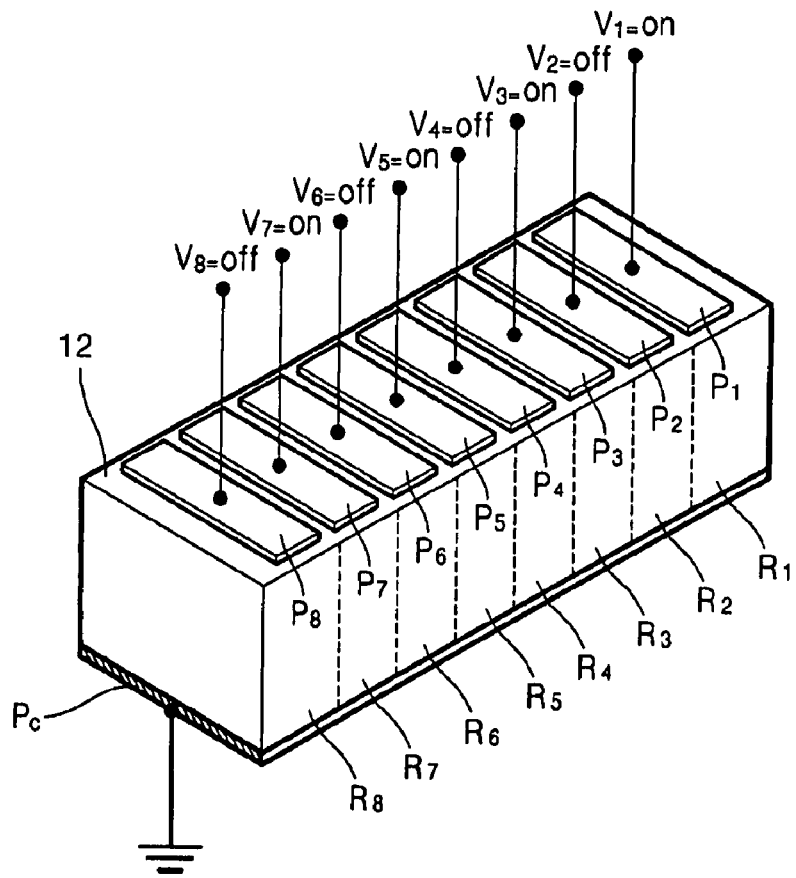
FIG. 3 is a perspective view of a light deflector in case that the 1D SLM of FIG. 1 has 8 pixel electrodes, according to an exemplary embodiment of the present invention.
Figure 4:
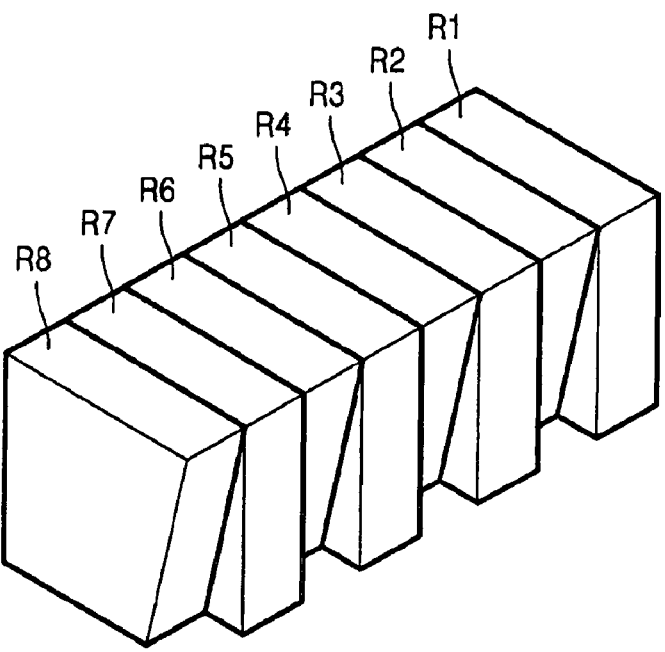
FIG. 4 illustrates an optical equivalent model for the light deflector of FIG. 3, according to an exemplary embodiment of the present invention.

FIG. 3 illustrates a light deflector having 8 pixel electrodes $P_1$ through $P_8$. FIG. 4 illustrates an optical equivalent model for the light guide 12 shown in FIG. 3 when a voltage is applied to odd-numbered pixel electrodes $P_1, P_3, P_5$, and $P_7$ of the 8 pixel electrodes $P_1$ through $P_8$.

Referring to FIG. 3, the light guide 12 is segmented into 8 pixel areas $R_1$ through $R_8$ corresponding to the 8 pixel electrodes $P_1$ through $P_8$. Because voltages are individually applied to the 8 pixel electrodes $P_1$ through $P_8$, linear shaped light incident on the light guide 12 may be independently directed or deflected for each of the pixel areas $R_1$ through $R_8$.

In the light deflector of FIG. 3, a voltage is individually applied to the odd-numbered pixel electrodes $P_1, P_3, P_5$, and $P_7$ while no voltage is applied to even-numbered pixel electrodes $P_2, P_4, P_6$, and $P_8$. The second electrode $P_C$ is grounded. As illustrated in FIG. 4, odd-numbered pixel areas $R_1, R_3, R_5$, and $R_7$ in the light guide 12 may be represented as transparent media with incident and exit surfaces being parallel to each other. Even-numbered pixel areas $R_2, R_4, R_6$, and $R_8$ may be represented as transparent media with exit surfaces being oblique to the incident surface. Light of the linear shaped light incident on the light guide 12 passing through the odd-numbered pixel areas $R_1, R_3, R_5$, and $R_7$ is directed while light passing through the even-numbered pixel areas $R_2, R_4, R_6$, and $R_8$ is deflected.

The linear shaped light L incident on the light guide 12 may be directed or deflected on a pixel-by-pixel basis by turning on or off a voltage applied to each of the pixel electrodes $P_1$ through $P_8$ in this way. Because the linear shaped light L can be directed or deflected on a pixel-by-pixel basis, the 1D SLM 10 can modulate the incident linear shaped light L for each pixel.

An exit surface of the optical equivalent model of FIG. 4 has a similar structure to a diffraction grating including a plurality of diffraction grating elements. That is, if the linear shaped light L has a wavelength similar to or shorter than linear shaped light which can pass through each of the plurality of pixel areas $R_1$ through $R_8$, the linear shaped light L will be diffracted. However, because the diffraction causes interference between adjacent pixels, the 1D SLM should be constructed to minimize diffraction.

Figure 5:
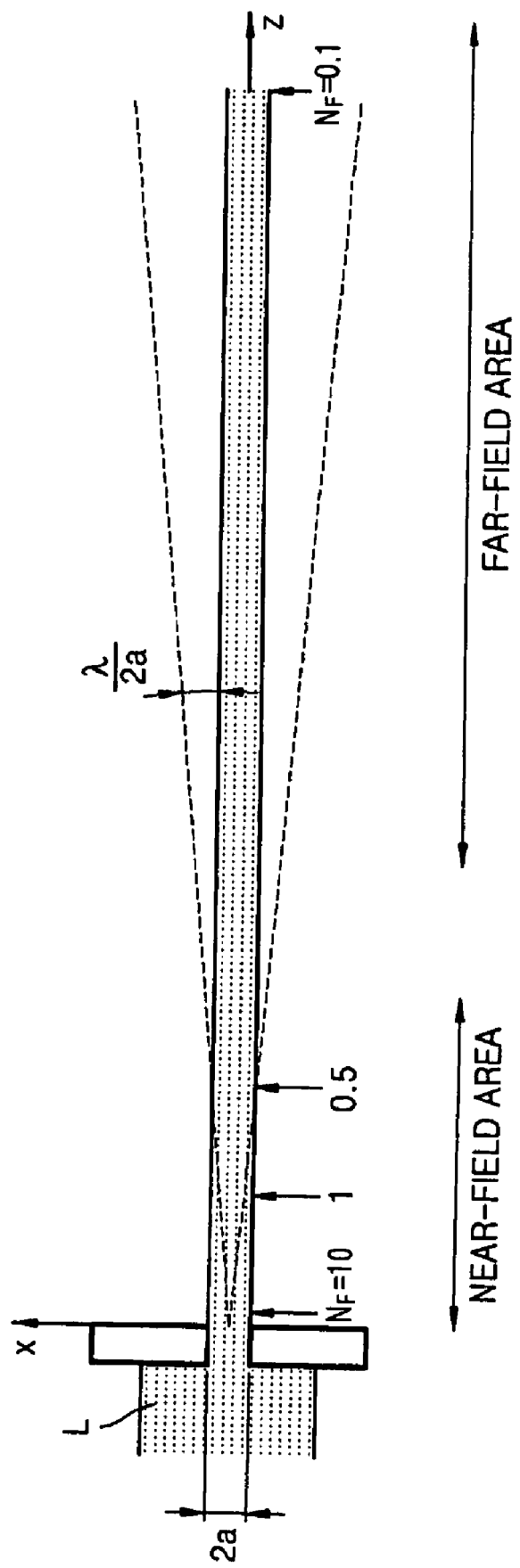
FIG. 5 illustrates diffraction of light passing through an aperture, according to an exemplary embodiment of the present invention.

The requirements for minimizing diffraction will now be described with reference to FIGS. 5 and 6A through 6D. FIG. 5 illustrates diffraction of light passing through an aperture. FIGS. 6A through 6D illustrate distribution of light intensities at a location spaced a predetermined distance from the aperture;

Referring to FIG. 5, the aperture has a diameter of 2a, light incident on the aperture has a wavelength of $\lambda$, and light passing through the aperture has a diffraction angle of $\lambda/2a$. A near-field area refers to an area close to the aperture, in which diffraction occurs slightly and a size of diffracted light equals to about the diameter 2a of the aperture. The light in the near-field area may be interpreted according to the theory of ray optics. On the other hand, a far-field area refers to an area far away from the aperture, in which much diffraction is apparent. A Fresnel number $N_F$ decreases away from the aperture. The Fresnel number $N_F$ is defined by Equation (3):

$$N_F = a^2/\lambda d \tag{3}$$

where d is a distance from the aperture.

Figure 6A:
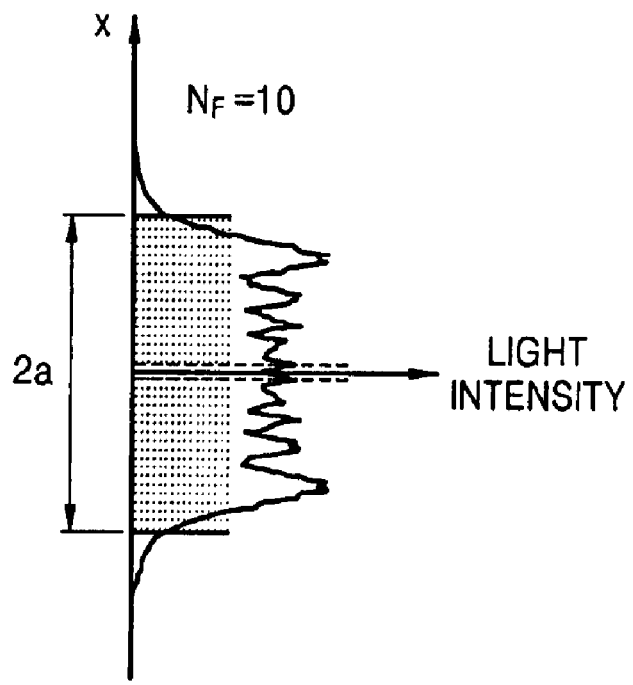
FIGS. 6A through 6D illustrate distribution of light intensities at a location spaced a predetermined distance from the aperture, according to an exemplary embodiment of the present invention.
Figure 6B:
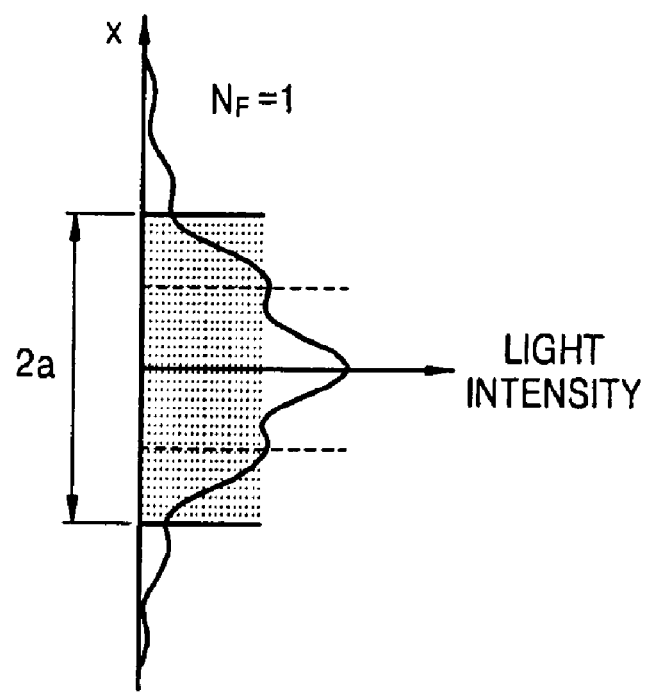
Figure 6C:
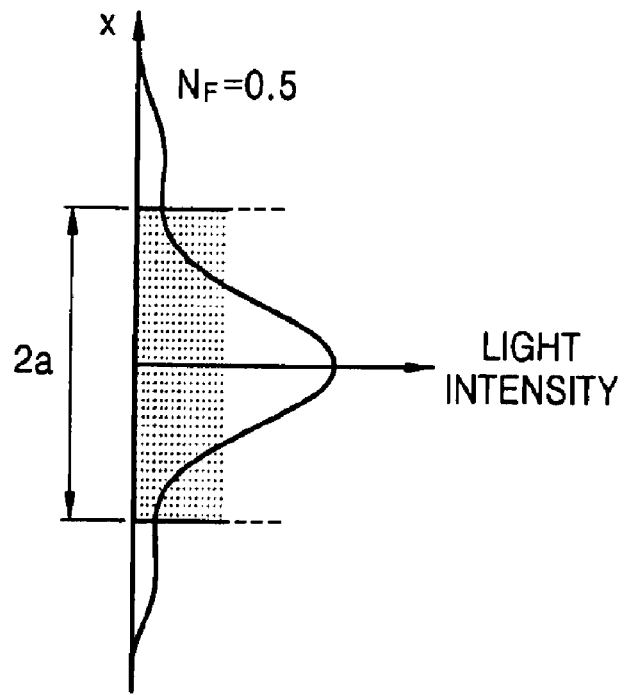
Figure 6D:
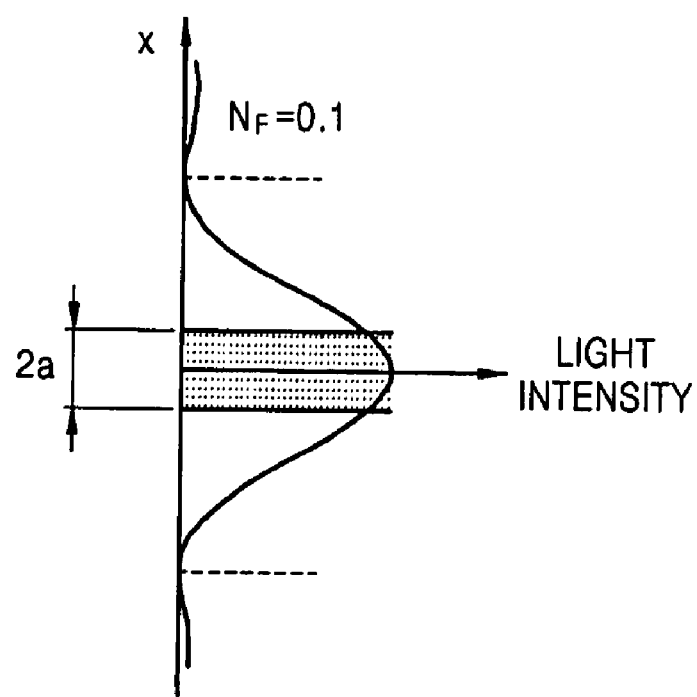

FIGS. 6A through 6D illustrate distributions of light intensities when the Fresnel number $N_F$ is 10, 1, 0.5, and 0.1. As illustrated in FIGS. 6A through 6C, light in the near-field area is concentrated within a diameter range of the aperture. As is evident from FIG. 6D, light in the far-field area is dispersed outside the diameter range of the aperture. That is, the near-field area has a Fresnel number $N_F$ approximately greater than 0.5 and light passing through the aperture maintains a diameter approximately equal to the aperture diameter in the near-field area.

Thus, the 1D SLM according to an exemplary embodiment of the present invention allows linear shaped light modulated for each pixel to maintain a modulated pattern without interference between adjacent pixels in the near-field area located a distance corresponding to a Fresnel number $N_F$ approximately greater than 0.5 from a light exit surface of the light guide 12.

An image output device employing a 1D SLM according to an exemplary embodiment of the present invention will now be described with reference to FIGS. 7 and 8.

Figure 7:
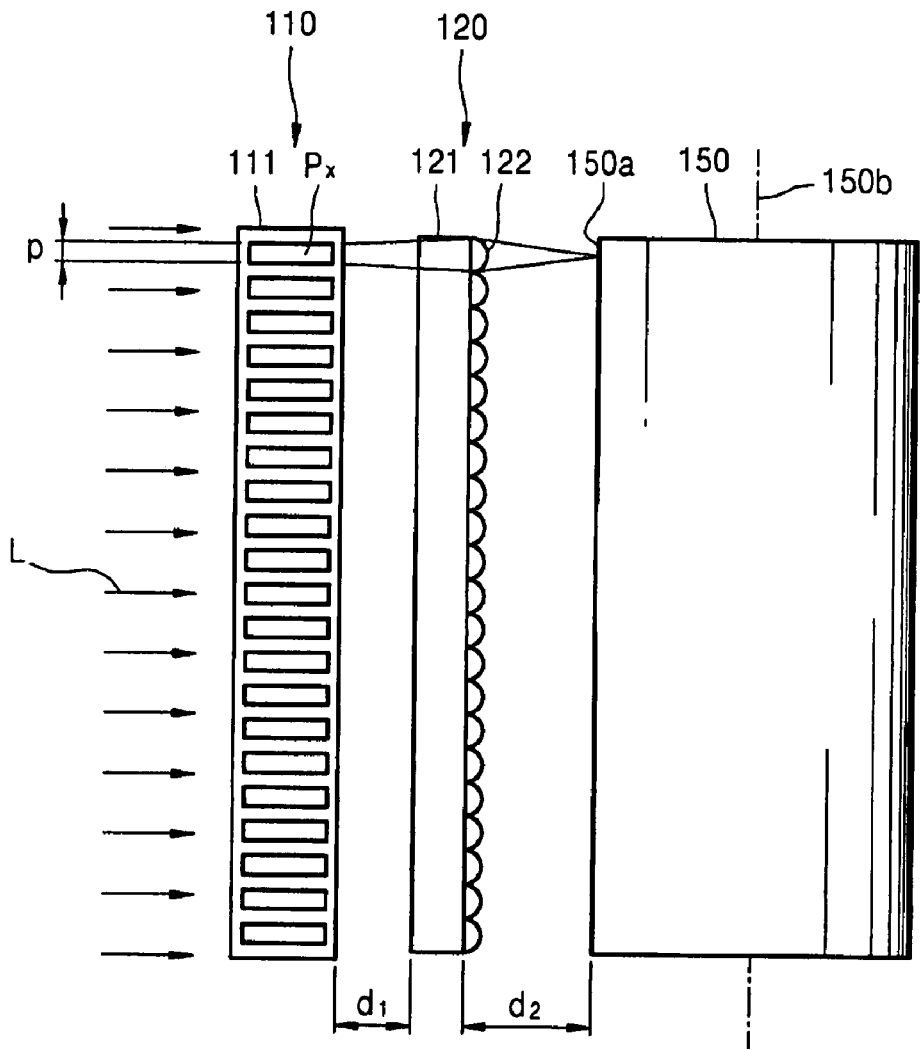
FIG. 7 is a schematic diagram of an image output device according to an exemplary embodiment of the present invention.
Figure 8:
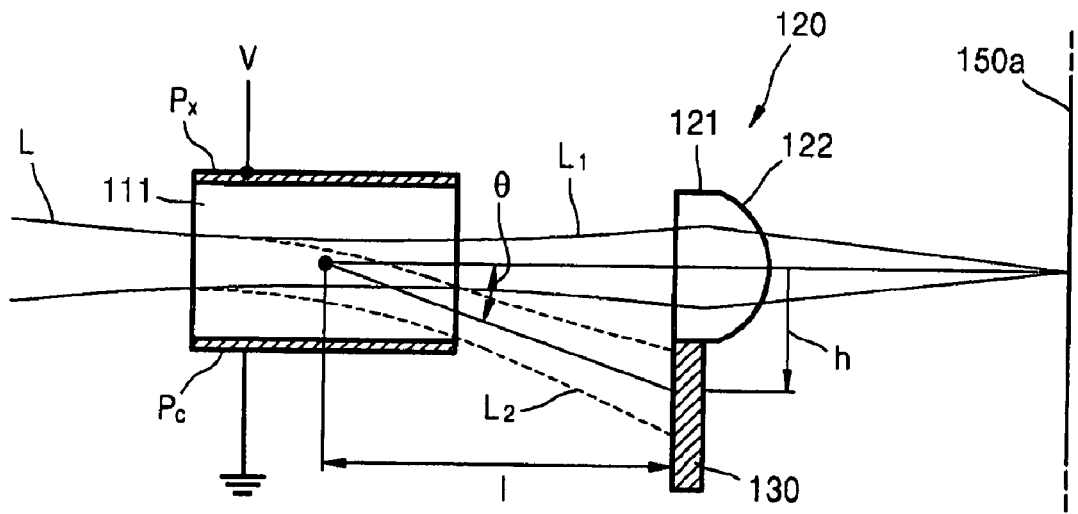
FIG. 8 illustrates the operation of the image output device of FIG. 7, according to an exemplary embodiment of the present invention.

FIG. 7 is a schematic diagram of an image output device according to an exemplary embodiment of the present invention and FIG. 8 illustrates an optical arrangement of a 1D SLM and a microlens array in the image output device according to an exemplary embodiment of the present invention.

Referring to FIGS. 7 and 8, the image output device according to the present exemplary embodiment includes a 1D SLM 110, a microlens array 120, and an exposed object 150. For example, the image output device may be an image forming apparatus such as a laser printer.

A light source (not shown) irradiates linear shaped light L onto the 1D SLM 110.

The 1D SLM 110 modulates incident linear shaped light L. The 1D SLM 110 includes an electrode portion applying a voltage to each pixel according to an image signal, a light guide 111 directing or deflecting incident linear shaped light L on a pixel-by-pixel basis, and a light blocking member 130 blocking a portion of light that is deflected. Because the 1D SLM 110 has substantially the same configuration and operation principle as the 1D SLM 10 described above with reference to FIGS. 1 and 2, a detailed explanation thereof will not be given.

The micro lens array 120 includes a plurality of lens cells 122 arranged on a transparent substrate 121 in a line. The plurality of lens cells 122 focus linear shaped light L modulated by the 1D SLM 110 on a pixel-by-pixel basis. The plurality of lens cells 122 may correspond one-to-one with the plurality of pixel electrodes in the 1D SLM 110.

The micro lens array 120 may be located in a near-field area of the 1D SLM 110 so as to prevent interference between the modulated linear shaped light L due to diffraction. Because each pixel area in the 1D SLM 110 has a size of p that is approximately equal to a diameter of an aperture (e.g., 2a in FIG. 5), the near-field area can be obtained using the Equation (3). If the wavelength of incident linear shaped light is 0.5 μm and the size p of each pixel area is 50 μm, a distance corresponding to Fresnel number 0.5 is approximately 2.5 mm. That is, the near-field area within the 1D SLM 110 is located a distance less than 2.5 mm from the linear shaped light L having the wavelength of 0.5 μm. Thus, a distance d, between the 1D SLM 10 and the micro lens array 120 may be less than 2.5 mm.

If a pixel area has a size p of 50 μm, light $L_1$ or $L_2$ directed or deflected through the light guide 111 has a diameter of approximately 50 μm. Considering the diameter of the light $L_1$ being directed through the light guide 111, the light blocking member 130 may be located a distance greater than about 60 μm from an central axis of the light $L_1$ being directed. For example, if the deflection angle θ of the light $L_2$ being deflected is 12°, a distance I between the light blocking member 130 and the light guide 111 may be greater than about 0.28 mm. Thus, the light blocking member 130 is formed integrally with the micro lens array 120 as illustrated in FIG. 8 so that they are located a distance of between 0.28 mm and 2.5 mm from a light exit surface of the light guide 111.

The linear shaped light L modulated by the 1D SLM 110 forms an electrostatic latent image on the exposed object 150.

The exposed object 150 has an exposed surface 150a sensitive to light. For example, the exposed object 150 may be a photoreceptor drum. When linear shaped light L modulated by the 1D SLM 110 is irradiated on the exposed surface 150a of the exposed object 150, it creates a two-dimensional (2D) electrostatic latent image on the exposed surface 150a as the exposed object 150 rotates about an axis 150b.

The exposed surface 150a of the exposed object 150 may be located at a focal position of the lens cell 122 to obtain a clearer electrostatic latent image.

The image output device according to the present exemplary embodiment further includes a transfer unit (not shown) transferring the electrostatic latent image created on the exposed object 150 onto a print medium and a fixing unit fixing the image transferred to the print medium and outputs an image signal onto the print medium. Since a development unit (not shown) supplying toner to the exposed object 150, the transfer unit, and the fixing unit are well known in the art, a detailed description thereof will not be given.

Figure 9:
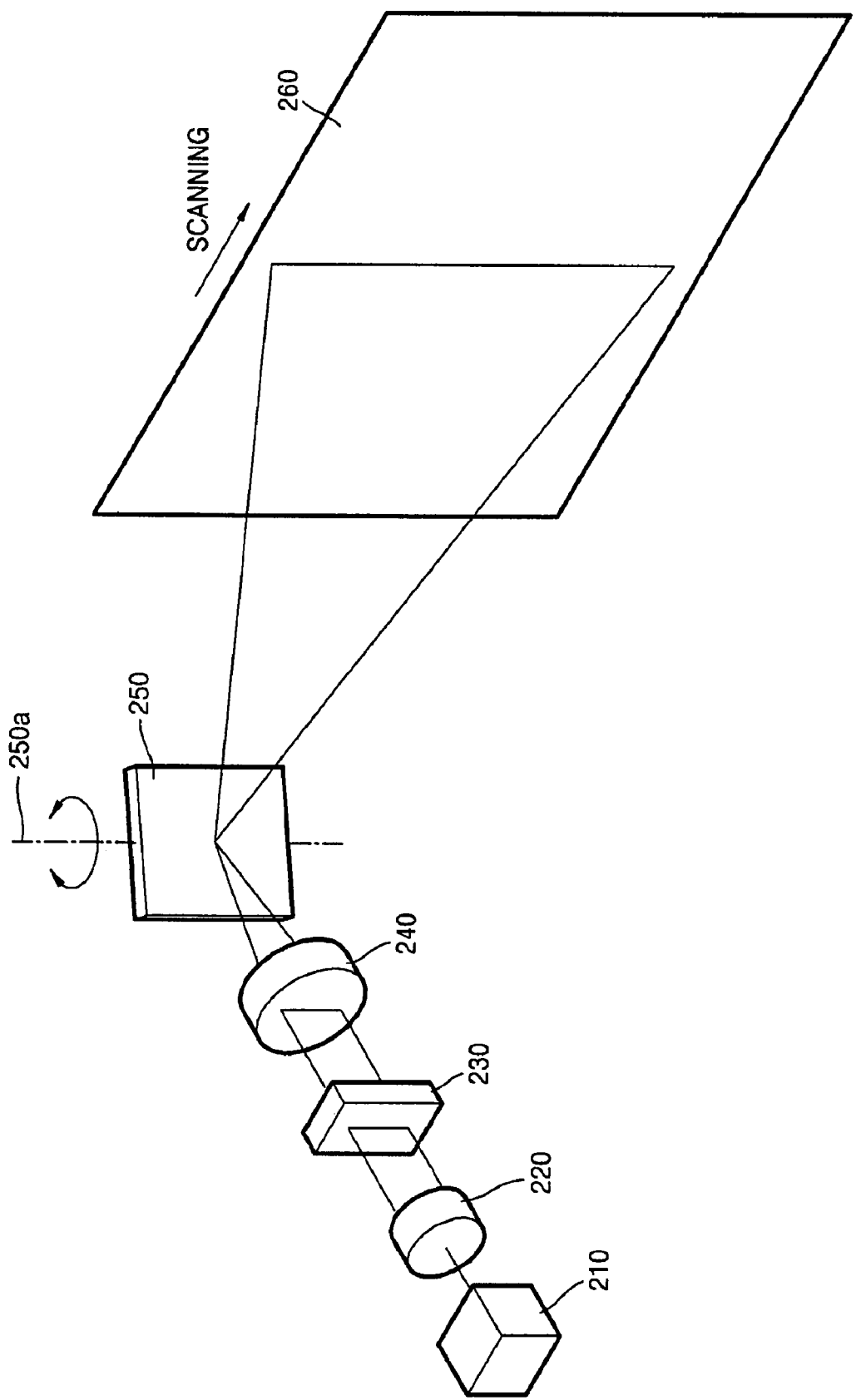
FIG. 9 is a schematic diagram of an image output device according to an exemplary embodiment of the present invention.

FIG. 9 is a schematic diagram of an image output device according to another exemplary embodiment of the present invention.

Referring to FIG. 9, the image output device according to the present exemplary embodiment includes a light source 210, a beam shaper 220, a projection lens unit 240, a 1D optical scanner 250, and a screen 260. For example, the image output device may be an image display device such as a laser display. The beam shaper 220, the projection lens unit 240, and the 1D optical scanner 250 have known configurations and operation principles, and thus their description will be omitted.

For example, the light source 210 may be a lamp, laser diode, or light-emitting diode (LED). The beam shaper 220 shapes light emitted by the light source 120 into linear shaped light. The 1D SLM 230 modulates the incident linear shaped light. Because the 1D SLM 230 has substantially the same configurations and operation principles as the 1D SLM 10 or 110 of FIG. 1 or 7, a detailed description thereof will not be given.

The projection lens unit 240 enlarges and projects linear shaped light modulated by the 1D SLM 230 onto the screen 260. The linear shaped light modulated by the 1D SLM 230 is scanned through the 1D optical scanner 250. For example, the 1D optical scanner 250 may be a one-axis driving micro scanner. The one-axis driving micro scanner rotates a mirror suspended to enable a seesaw motion using an electrostatic effect generated due to the structure of a comb-typed electrode thereof. A rotary axis 250a of the mirror is disposed in the same direction as a longitudinal direction of the linear shaped light. The 1D optical scanner 250 rotates a mirror surface so as to scan linear shaped light modulated by the 1D SLM 230 onto the screen 260 in a direction perpendicular to the longitudinal direction of the linear shaped light.

The projection lens unit 240 may be disposed such that a focal point is located on a mirror surface of the 1D optical scanner 250, so as to achieve a compact 1D optical scanner or eliminate the need for additional optical components.

The image output device having the above-mentioned configuration creates a 2D image on the screen 260 through a combination of the 1D SLM 230 and the 1D optical scanner 250.

As described above, a 1D SLM and an image output device employing the 1D SLM according to an exemplary embodiment of the present invention have the following advantages.

First, because the 1D SLM is not a mechanical driving device such as an optical scanning unit using a polygon mirror, it has high design flexibility while preventing the generation of audible noise.

Second, the 1D SLM is not designed to scan one point at a time, thus eliminating the need to use an additional lens system for optical correction.

Third, the 1D SLM allows adjustment of the amount of light transmitted on a pixel-by-pixel basis by adjusting an applied voltage, thus enabling easy gradation expression of an image.

Fourth, the 1D SLM having a simple structure is easy to manufacture and enables easy handling for maintenance.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A one-dimensional (1D) spatial light modulator comprising:
    a light deflector comprising:
        a light guide having an incident surface onto which light is incident and an exit surface from which the incident light exits, the light guide being formed of a photonic crystal material having a refractive index that is operative to be varied according to an applied voltage and allowing the incident light to continue along an original propagation path while the incident light passes from the incident surface to the exit surface or deflecting the incident light from the original propagation path on a pixel-by-pixel basis while the incident light passes from the incident surface to the exit surface; and an electrode portion individually applying a voltage to the light guide; and a light blocking member that faces a light exiting surface of the light deflector, and blocks a portion of light exiting the light deflector.

2. The modulator of claim 1, wherein electrodes of the electrode portion make ohmic contacts with the light guide.

3. The modulator of claim 2, wherein the electrode portion comprises a plurality of pixel electrodes and a common electrode disposed on two opposing sides of the light guide, and wherein the incident light comprises linear shaped light, and passes through a region between the plurality of pixel electrodes and the common electrode.

4. The modulator of claim 3, wherein the plurality of pixel electrodes are arranged in a line parallel to a longitudinal direction of the linear shaped light.

5. The modulator of claim 2, wherein the electrode portion comprises a plurality of pixel electrode pairs, two electrodes of each pair being formed on two opposing sides of the light guide, and wherein the incident light comprises linear shaped light, and passes through a region between the plurality of pixel electrode pairs.

6. The modulator of claim 5, wherein the plurality of pixel electrode pairs are aligned on opposing sides of the light guide parallel to a longitudinal direction of the linear shaped light, the plurality of pixel electrode pairs being arranged in a line.

7. The modulator of claim 1, wherein the light guide is formed of lithium niobate, which is known as LiNbO$_3$ or LiNbO, and potassium (K)-tantalum (Ta)-niobium (Nb) which is known as KTN.

8. An image output device comprising a one-dimensional (1D) spatial light modulator modulating incident light according to an image signal, wherein the 1D spatial light modulator comprises:

a light deflector comprising:

a light guide having an incident surface onto which light is incident and an exit surface from which the incident light exits, the light guide being formed of a photonic crystal material having a refractive index that is operative to be varied according to an applied voltage and allowing the incident light to continue along an original propagation path while the incident light passes from the incident surface to the exit surface or deflecting the incident light from the original propagation path on a pixel-by-pixel basis while the incident light passes from the incident surface to the exit surface; and an electrode portion individually applying a voltage to the light guide; and a light blocking member that faces a light exiting surface of the light deflector, and blocks a portion of light exiting the light deflector.

9. The device of claim 8, wherein electrodes of the electrode portion makes ohmic contacts with the light guide.

10. The device of claim 9, wherein the electrode portion comprises a plurality of pixel electrodes and a common electrode disposed on two opposing sides of the light guide, and wherein the incident light comprises linear shaped light, and passes through a region between the plurality of pixel electrodes and the common electrode.

11. The device of claim 9, wherein the electrode portion comprises a plurality of pixel electrode pairs, two electrodes of each pair being formed on two opposing sides of the light guide, and wherein the incident light comprises linear shaped light, and passes through a region between the plurality of pixel electrode pairs.

12. The device of claim 8, wherein the light guide is formed of lithium niobate, which is known as LiNbO$_3$ or LiNbO, and potassium (K)-tantalum (Ta)-niobium (Nb) which is known as KTN.

13. The device of claim 8, further comprising a micro lens array comprising a plurality of lens cells arranged in a line to focus the incident light modulated by the 1D spatial light modulator on a pixel-by-pixel basis, wherein the incident light comprises linear shaped light.

14. The device of claim 13, wherein the micro lens array is located in a near-field area of the 1D spatial light modulator.

15. The device of claim 13, wherein the micro lens array is formed integrally with the light blocking member of the 1D spatial light modulator.

16. The device of claim 8, farther comprising an exposed object having an exposed surface that is irradiated by the incident light modulated by the 1D spatial light modulator, the exposed object moving perpendicular to a longitudinal direction of the incident light so as to create a two-dimensional (2D) latent image thereon, wherein the incident light comprises linear shaped light.

17. The device of claim 16, farther comprising a micro lens array that is disposed between the 1D spatial light modulator and the exposed object, and comprises a plurality of lens cells arranged in a line to focus the incident light modulated by the 1D spatial light modulator on a pixel-by-pixel basis, wherein the incident light comprises linear shaped light.

18. The device of claim 17, wherein the micro lens array is disposed such that the exposed surface of the exposed object is located at a focal point of the micro lens array.

19. The device of claim 8, farther comprising a 1D optical scanner which scans the incident light modulated by the 1D spatial light modulator in a direction perpendicular to a longitudinal direction of the incident light, wherein the incident light comprises linear shaped light.

* * * * *